United States Patent [19]

Botterill

[11] Patent Number: 5,230,255
[45] Date of Patent: Jul. 27, 1993

[54] GEARBOX SWITCHABLE UNDER LOAD INCLUDING A COUPLING SPREADING ASSEMBLY

[75] Inventor: John R. Botterill, Saarbrücken, Fed. Rep. of Germany

[73] Assignee: GKN Automotive AG, Siegburg, Fed. Rep. of Germany

[21] Appl. No.: 843,830

[22] Filed: Feb. 28, 1992

[30] Foreign Application Priority Data

Mar. 1, 1991 [DE] Fed. Rep. of Germany ....... 4106503

[51] Int. Cl.⁵ .............................................. F16H 3/08
[52] U.S. Cl. ..................................... 74/333; 192/93 A
[58] Field of Search ............. 74/333; 192/93 A, 48.91

[56] References Cited

U.S. PATENT DOCUMENTS

| | | | |
|---|---|---|---|
| 2,827,994 | 3/1958 | Tiedemann et al. | 192/93 A |
| 3,386,545 | 6/1968 | Hansen | 192/93 AX |
| 4,287,973 | 9/1981 | Eichinger et al. | 192/93 AX |
| 4,576,264 | 3/1986 | Lupp et al. | 192/93 AX |
| 4,817,772 | 4/1989 | Sacher | 192/48.91 |
| 4,834,229 | 5/1989 | Kanazawa | 192/93 AX |
| 4,878,567 | 11/1989 | Buckley et al. | 192/93 AX |
| 4,878,571 | 11/1989 | Sacher | 192/93 AX |
| 5,106,349 | 4/1992 | Botterill et al. | 192/93 AX |

*Primary Examiner*—Dirk Wright
*Attorney, Agent, or Firm*—Harness, Dickey & Pierce

[57] ABSTRACT

A gearbox switchable under load, has at least two parallel shafts to achieve different transmission stages. The shafts both carry gears which permanently engage each other in pairs. Each one of the gears may be connected to its associated shaft via a friction coupling which is switchable by an axially effective operating assembly. The operating assembly includes at least one first adjusting ring which is rotatable and axially fixed relative to the shaft. Also, the operating assembly has at least one second pressure ring which is non-rotatable and axially movable relative to the shaft. The rings are arranged relative to each other and rotate a limited angular amount. The opposed end faces of the pressure ring and adjusting ring are provided with circumferentially extending groove pairs to accommodate at least three rolling members. The depths of the groove pairs are variable in opposite directions. The pressure ring acts, via an axial pressure bearing, on the friction coupling. The adjusting ring and the pressure ring may be rotated relative to each other, via a rotator assembly, to spread apart relative to each other via the rolling members and the groove pairs. The above-mentioned parts form a spreading mechanism with the friction coupling, at least partially, radially embracing the spreading mechanism. The rotator assembly, via teeth at an outer disc connected to the adjusting ring, engages the adjusting ring with a gear drive and/or chain drive.

5 Claims, 3 Drawing Sheets

GEARBOX SWITCHABLE UNDER LOAD INCLUDING A COUPLING SPREADING ASSEMBLY

BACKGROUND OF THE INVENTION

The invention relates to a gearbox which is switchable under load. The invention includes at least two parallel shafts which achieve different transmission stages. Each shaft carries gears which are permanently engaged with each other in pairs. Each one of the gears may be connected to its associated shaft via a friction coupling switchable by an axially effective operating assembly.

Conventional automatic gearboxes which have planetary gears and are used as four-gear gearboxes with directly driven highest gears, while eliminating converters, meet the highest demands regarding comfort and economy. However, these systems are technically complicated and expensive.

Double clutch gearboxes (Porsche PDK gearbox) which, in principle, are designed like conventional manual gearboxes, are also able to switch without interrupting the traction force. The double clutch and the shaft design include a hollow shaft and inner shaft which increase production costs.

Automatic mechanical gearboxes whose design corresponds to the design of conventional manual gearboxes with only an automated coupling operation are disadvantageous because of the interruption of the traction force. In addition, these systems are expensive relative to the performance which they offer.

A review of the different gearbox designs is given in "1. Aachener Kolloquium Fahrzeug- und Motorentechnik" (1st Aachen Colloquium on vehicle and engine technology), October, 1987, conference papers, page 385 ff.

GB 1 582 237 proposes an automatic gearbox in which the switching sleeves are replaced by hydraulically operated friction couplings. The supply of the pressurized fluid via axial shaft bores and the control thereof is too complicated for cost effective production purposes and interference-free operation.

The subsequently published, former patent applications DE 39 28 816 A1 and DE 40 07 506 A1 describe a gearbox of the initially mentioned type. The gearbox is characterised by the operating assembly of its friction couplings. The couplings include a first adjusting ring which is rotatable and axially fixed relative to the shaft. A second pressure ring is rotatable and axially movable relative to the shaft. The rings are arranged rotatable relative to each other by a limited angular amount. The opposed end faces of the pressure ring and adjusting ring are provided with circumferentially extending groove pairs to accommodate at least three rolling members. The depths of the grooves are variable in opposite directions. The pressure ring acts, via an axial pressure bearing, on the friction coupling. The adjusting ring and pressure ring may be rotated relative to each other, via a rotator assembly, to radially engage one of the rings to spread apart relative to each other via the rolling members and groove pairs. The rotator assembly of the adjusting ring includes a motor-operated worm gear or pinion.

The rotary movement is preferably initiated by a simplified rotator assembly with a gearwheel drive driven by an electric motor with a gearwheel engaging the toothed edge of the respective adjusting ring. It has been found that a pulsed electric motor may be advantageous. In consequence, hysteresis losses during the increase and decrease of the axial pressure of the friction coupling are very favorable, as a result of the simultaneous engagement and disengagement processes of two couplings. Furthermore, the pulsed current of the electric motor provides a very economical basis to electronically control two electric motors which are operated simultaneously.

The rotary assembly to actuate the spreading mechanism is preferably coupled with a brake in such a way that at the point in time when the electric motor is in a current-less condition, the brake holds the respective spreading mechanism in position. When the current is reconnected, the brake is disengaged. In an advantageous embodiment, the brake may function as an electro-magnetically operated spring brake fitted either directly at the electric motor or in the housing of the rotator assembly.

SUMMARY OF THE INVENTION

It is the object of the present invention to propose an operating assembly which improves the space requirements and the efficiency of the gearbox. The objective is achieved by the operating assembly of the friction coupling including at least one first adjusting ring which is rotatable and axially fixed relative to the shaft. At least one second pressure ring is non-rotatable relative to the gear box and rotatable and axially movable relative to the shaft. The rings are rotatably arranged relative to each other such that there is a limited amount of angular movement between them. The opposed end faces of the pressure ring and adjusting ring have circumferentially extending groove pairs to accommodate at least three rolling members. The depths of the groove vary in opposite directions. The pressure ring acts, via an axial pressure bearing, on the friction coupling. The adjusting ring and the pressure ring may be rotated relative to each other, via a rotator assembly, to spread apart relative to each other, via the rolling members and the groove pairs. The above-mentioned parts form a spreading mechanism. The friction coupling, at least partially, radially embraces the spreading mechanism. The rotator assembly, via teeth at an outer disc connect to the adjusting ring, engages the adjusting ring and includes a gear drive and/or a chain drive.

The operating assembly of the present invention has been found to be advantageous over the operating assembly of patent applications DE 39 28 816 A1 and DE 40 07 506 A1. Among other things, the new assembly offers the advantage of having a shorter length and a greater effective plate friction radius than the design described in the earlier applications. The fact the spreading mechanism is radially embraced by the friction coupling presupposes a certain diameter ratio which can be achieved by radially reducing the size of the spreading mechanism and/or radially increasing the friction plates of the friction coupling.

From the following detailed description taken in conjunction with the accompanying drawings and subjoined claims, other objects and advantages of the present invention will become apparent to those skilled in the art.

DETAILED DESCRIPTION OF THE DRAWINGS

A preferred embodiment of the invention is illustrated in the drawing wherein

FIG. 3b is a view of the end face of the pressure ring of the spreading mechanism of FIG. 3a.

DETAILED DESCRIPTION OF THE PREFERRED EMBODIMENT

Figure 1:
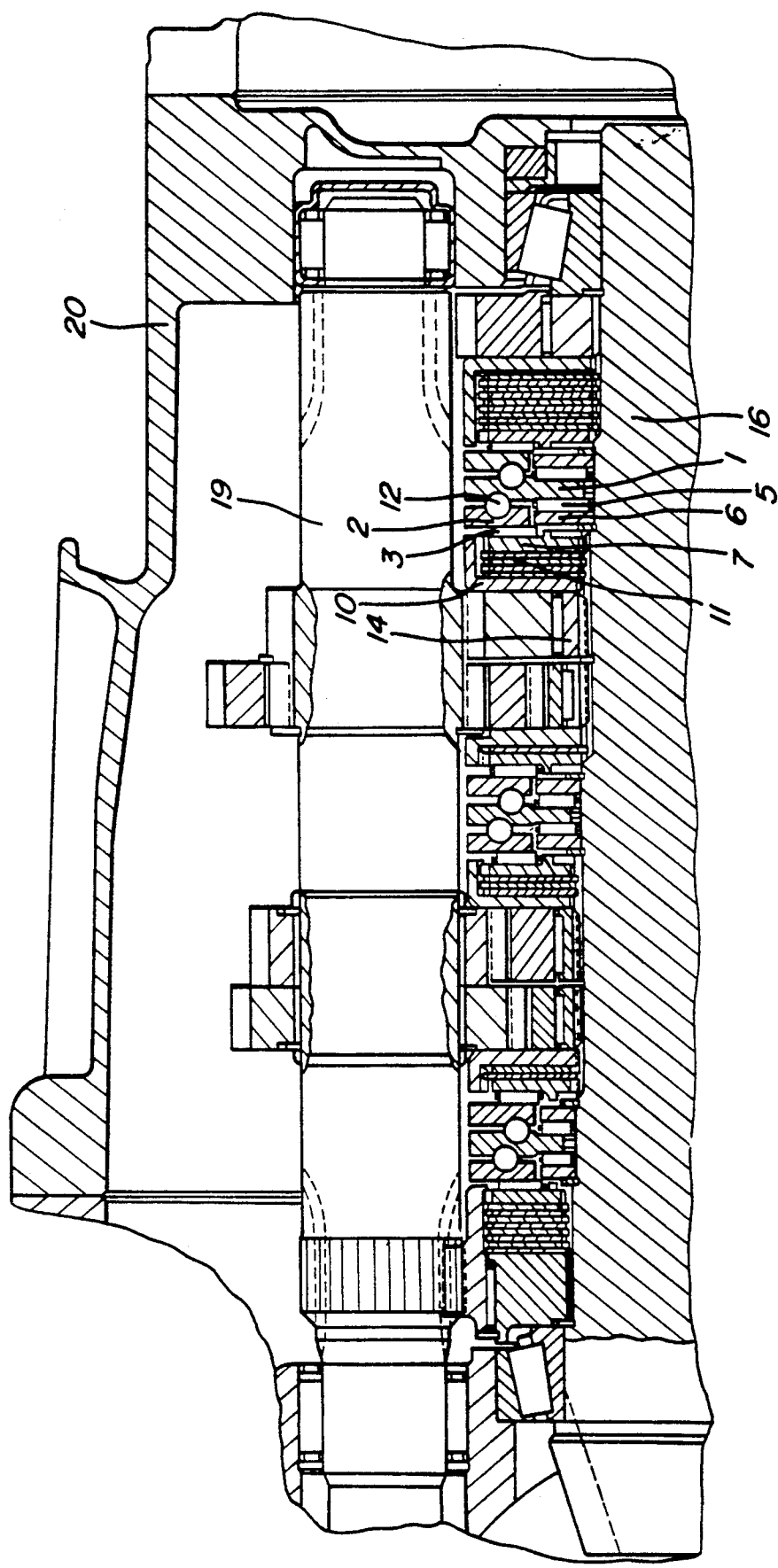
FIG. 1 is a cross section view in the longitudinal direction of the shaft through a gearbox switchable under load, of the type as proposed by the invention.

FIG. 1 illustrates a longitudinal section through two shafts 16 and 19 of a gearbox of the type above described. The shafts are arranged in parallel in a housing 20 and supported by rolling contact bearings. The gearbox has five forward gears and one reverse gear. The friction coupling spreading mechanism assemblies referred to below as the switching mechanisms, provided in triplicate for each two gears per mechanism, are arranged between the tooth pairs of the respective gears. The switching mechanisms are similar to the synchronizing ring sliding sleeves in conventional manually operated passenger car gearboxes.

The switching mechanisms may be fitted either on the upper input shaft 19 or, as illustrated in FIG. 1, on the lower output or counter shaft 16. If, as illustrated, pinions integrated into the input shaft are provided for the first gear and the reverse gear, the respective switching mechanisms should be provided only at the output shaft 16. The number of plates in each gear depends on the engine torque, the gear ratio and the permissible friction plate pressure. The number of plates is also determined by the maximum permissible axial force acting on each set of two needle roller bearings also subjected to the loads.

The tooth pairs of gears "1" to "5" are described by encircled numbers and the reverse gear has the reference symbol "R" in a circle.

Figure 2:
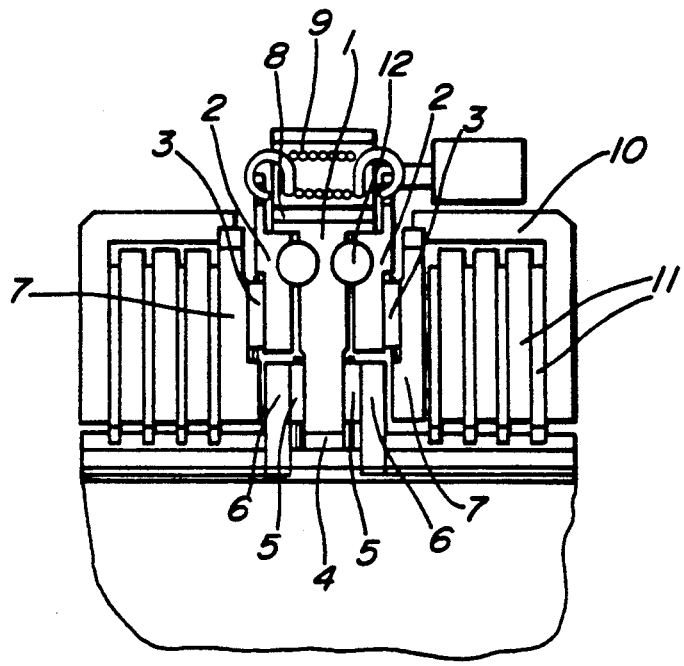
FIG. 2 is a longitudinal section through the friction coupling spreading mechanism assembly according to the earlier applications DE 39 28 816 A1 and DE 40 07 506 A1.

The switching mechanism of the type previously applied for and illustrated in FIG. 2, includes a limited range of rotation rotatable adjusting ring 1. The adjusting ring 1 on needle bearing 4 is rotatable in both directions by a drive with a motor driven gear meshing with teeth 8.

By rotating the adjusting ring 1, the friction coupling 11 is subjected to an axial force, via spreading grooves 15 balls 12, pressure ring 2, axial bearing 3 and pressure plate 7. The pressure ring 2 is prevented from rotating by a groove and tongue assembly (not shown).

The axial force at the friction coupling 11 acts on the output shaft 16 via the plate housing 10, thereafter preferably via a low-friction axial support and an axially supported gearwheel bearing ring 14.

The reaction force of the adjusting ring 1 acts via a bearing 5 on the supporting disc 6 and the output shaft 16.

Figure 3A:
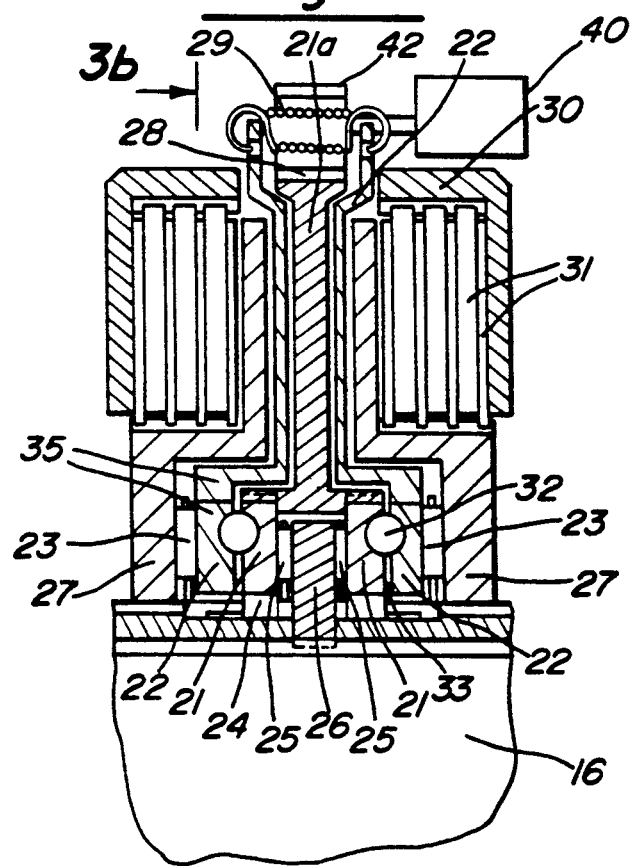
FIG. 3a is a longitudinal section view through a friction coupling spreading mechanism assembly in accordance with the invention.
Figure 3B:
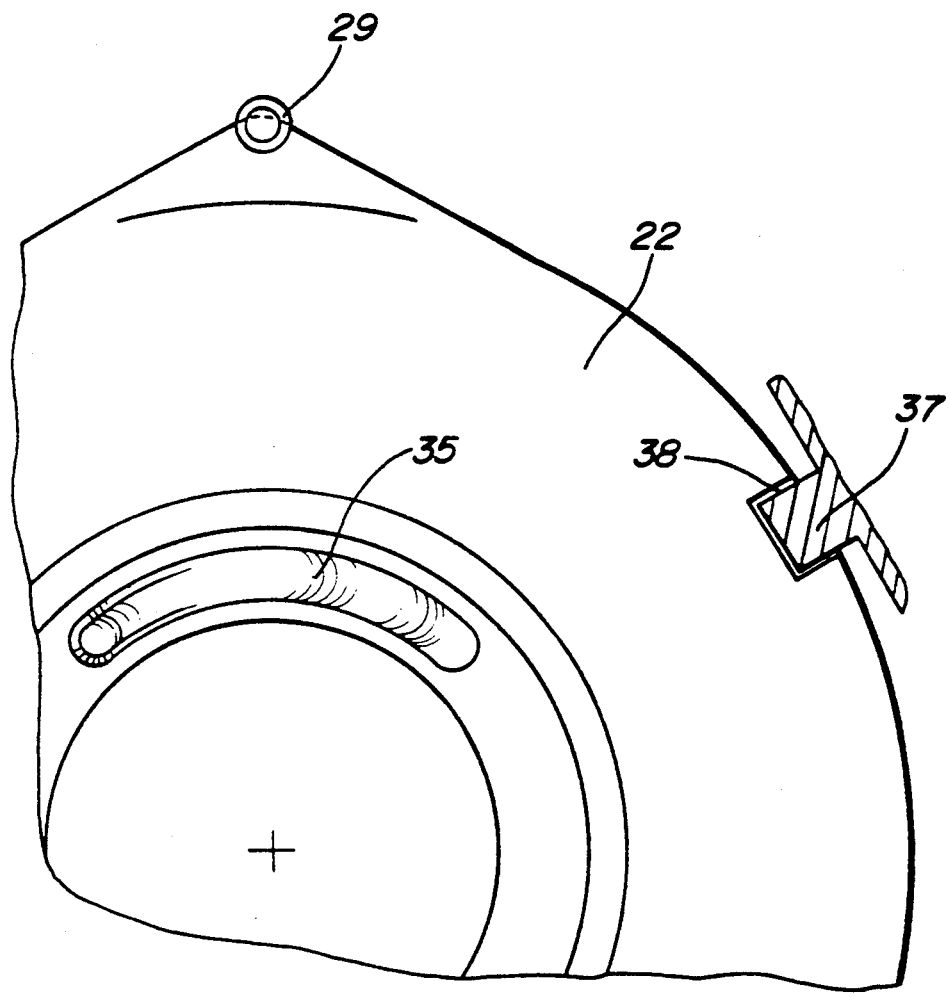

The invention proposes an alternative to the switching mechanism according to FIG. 2 in the form of the switching mechanisms according to FIGS. 3a and 3b.

Two limited range rotatable adjusting rings 21 are positioned about shaft 16 and are driven in both directions of rotation by an outer disc 21a. The outer disk 21a may be in the form of a disk sector. The outer disk 21a is driven by a motor 40, shown in schematic with a worm gear 42 or pinion meshing with circumferentially arranged teeth 28. For assembly purposes, the outer disc 21a axially slides into engagement with at least one of the two adjusting rings 21. One of the adjusting rings 21 on needle bearing 24 may be axially fixed on shaft 16 relative to the outer disc 21a.

When rotating the outer disc 21a and thus the adjusting ring 21, depending on the direction of rotation, one of the friction couplings 31 is subjected to an axial force. The force locking effect is achieved via a non-rotatable, with respect to the gear box, pressure ring 22 and an axial bearing 23. However, the pressure ring 22 is rotatable and axially movable relative to the shaft. The pressure ring 22 is prevented from rotating with respect to the gear box by a groove and tongue assembly 38 and 37, as seen in FIG. 3b. The tongue 37 is connected to a fixed part of the housing 20. The axial force applied to the friction coupling 31 also acts on the output shaft 16 via the plate housing 30, then preferably via a low-friction axial support and an axially supported gearwheel bearing sleeve 14. Balls 32 are sandwiched between the adjusting rings 21 and the non-rotatable pressure rings 22. The pressure rings 22 and adjusting rings 21 include ramped grooved surfaces 35 having a varied depth. As the adjusting ring 21 moves relative to the pressure ring 22, due to the ramped grooves 35, the pressure ring 22 moves axially which, in turn, axially moves bearing 23 and pressure plate 27 which engages the friction coupling 31.

The reaction force of the adjusting ring 21 is accommodated via an axial bearing 25 by the single supporting disc 26. A cage plate 33 preferably holds the balls 32 in a constant circumferential position relative to each other.

At least two tension springs 29 serve to maintain an air gap between the friction plates when the friction coupling 31 is not engaged. At the same time, the springs 29 prevent the formation of an air gap in the ball grooves 35. This is also advantageous for accurate functioning of the spreading mechanism.

The advantages of the assembly in accordance with the invention are particularly obvious and effective in an automotive gearbox where the outer diameter of the plate housing is approximately 75 mm or greater. The advantages will be as follows: a reduced construction length and in consequence, a reduced gearbox length; friction plates with a greater friction radius and a small radial width; and a lower axial force acting on the friction coupling and thus lower loads acting on the axial bearing.

The connection between the outer disc 21a and the adjusting ring 21 may be established by a disc sector, a radial web, individual spokes or in any other way which permits a shorter axial construction length. To adapt the pressure rings 22, they may be cranked several times as illustrated in the axial half-section, so that they, too, ensure a short axial construction length.

While the above detailed description describes the preferred embodiment of the present invention, the invention is susceptible to modification, variation, and alteration without deviating from the scope and fair meaning of the subjoined claims.

I claim:

1. A switchable gearbox comprising:

at least two parallel shafts for providing different transmission stages, said shafts each carrying a plurality of gears, said gears intermeshing with one another as gear pairs, one of said gears of each gear pair coupled to one of said shafts via a friction coupling switchable by an axially moving operating assembly;

said operating assembly including an outer disk having a plurality of teeth coupled with a rotary means for rotating said outer disk;

at least one adjusting ring coupled for rotation with said outer disk, said adjusting ring rotatable and axially fixed relative to one of the two parallel shafts;

at least one pressure ring, said pressure ring being non-rotatable relative to the gear box and axially movable relative to the shaft and said shaft rotatable relative to said at least one pressure ring, said rings positioned adjacent one another and being rotatable with respect to one another a limited angular amount;

circumferentially extending grooves formed in opposing end faces of said adjusting ring and said pressure ring, said grooves having a varying depth such that the depth varies in opposite directions on said opposing faces, at least three rolling members positioned in said opposing grooves, wherein said adjustment ring is rotated relative to said pressure ring so that said pressure ring moves axially against a bearing means and engages said frictional coupling.

2. A gearbox according to claim 1, wherein said rotatory means includes a driving motor which drives the outer disc via one of a spur and/or bevel gear teeth or chain and chain wheel.

3. A gearbox according to claim 1, wherein said rotary means includes a braking device which is simultaneously released upon actuation of the rotary means.

4. A gearbox according to claim 1, wherein two adjusting rings are positioned between two pressure rings and held relative to each other in a supporting axial position via rolling members held in opposing grooves.

5. A gearbox according to claim 4, wherein said two adjusting rings, via respective axial pressure bearings, are supported on the output shaft by a single supporting disc.

* * * * *